UNITED STATES PATENT OFFICE.

SIGMUND LUFT, OF MAYWOOD, ILLINOIS.

FOOD PRODUCT AND PROCESS OF PREPARING SAME.

1,424,927.   Specification of Letters Patent.   Patented Aug. 8, 1922.

No Drawing.   Application filed August 2, 1920. Serial No. 400,768.

*To all whom it may concern:*

Be it known that I, SIGMUND LUFT, a citizen of the United States, residing at Maywood, in the county of Cook and State of Illinois, have invented certain new and useful Improvements in Food Products and Processes of Preparing Same, of which the following is a specification, reference being had to the accompanying drawings, and to the reference characters marked thereon, which form a part of this specification.

This invention relates to prepared food products and the process of preparing the same; and more particularly to a roasted food product made from cereals such as oats, barley, rye and wheat.

The principal object of my invention is to produce a food product that will be "ready to eat" without any additional cooking; a product characterized by the absence of rancidity; a product which will be economical in use and palatable by being mixed with water instead of requiring the addition of cream or milk to make it palatable; and a product which will be easy to produce, relatively cheap to manufacture and available for immediate use after having been in storage for a long period of time.

Another object of my invention is to keep the individual kernels of the cereal separated during the process of preparing same, and in the resultant product.

One of the principal objects and advantages of my process is its simplicity and the fact that the finished product is so prepared as to practically lose none of its valuable and nutritious properties while in process. That is to say, the finished prepared product retains substantially one hundred per cent of the nutritious elements present in the raw cereal.

In making my product, I proceed as follows: I take a cereal, such as oats, and remove the hulls therefrom and separate the hulls from the kernels. This separation may be performed by any ordinary mechanical device which will crack and loosen the hulls and the separation may be performed by sifting through a sieve or other suitable device. In the sifting step, a small amount of flour that may have been formed in the removal of the hulls will, of course, be sifted out with the hulls.

The kernels are now free from hulls and in their individual, natural shape and condition. I next subject the kernels of the cereal to a tempering process, i. e., I cause them by suitable means to absorb sufficient moisture to enable the kernels to be rolled into the form of thin scales without being broken. I next subject these individuals kernels of the cereal to the crushing or rolling action of any mechanical device that will flatten out or thin them so as to produce a plurality of individual, or thin scales,—one from each kernel of the cereal. The purpose of making each kernel into a thin sheet or scale is to increase the surface area of the cellular structure so as to expose the greatest possible surface of each grain of the cereal to the application of heat, which is the next step in my process. I place the thin scales of the cereal in a suitable vessel and submit them to heat treatment, at such a roasting temperature as will thoroughly remove the moisture and convert the starch into dextrin. During this heat treatment, the cereal is thoroughdly stirred or agitated and when the roasting is completed, the entire mass emits a sweet, pleasant and appetizing odor, and is entirely free from and immune to rancidity.

The heat temperature in the roasting step will be somewhat varied according to the condition of the grain per se,—whether it is fresh or old; while the length of the heat treatment will depend upon the degree of temperature at which the treatment is started. I find, for example, that with some oats, I can start the roasting temperature at approximately 150° F. and gradually raise the same through a period of about one hour to a temperature of approximately 300° F., maintaining it at the latter temperature not to exceed five minutes. With oats in other condition, I have started the roasting process at a temperature of 180° F. and carried it to about 300° F., maintaining it at the latter temperature not to exceed two minutes. Of course, the heat penetrates the individual scales and acts upon the cereal more quickly and more thoroughly because of the thin, scaly condition due to the crushing or rolling step above referred to producing an evaporation of all moisture and effecting a protective surfacing of the scale which prevents the reabsorption of moisture thus preserving the condition of crispness.

After being thus roasted, the mass may be allowed to cool and placed in a container for use.

After the roasting step and before placing the roasted scales in containers for use, I may make the product more palatable by placing the same in an agitating device having a heating attachment whereby the cereal may be retained at a temperature of about 200° F. When in this agitator device, I blend with the grain a suitable saccharine substance, such as sugar, molasses or syrup. The heat will sufficiently melt the sugar to cause it to physically adhere to the individual scales of roasted cereal. When using molasses or syrup, I prefer to dilute the same into a very thin liquor and pour it in very slowly, while the roasted scales are being agitated, whereby the blending of the thin syrup will result in almost completely covering each individual scale of roasted grain.

In some cases, it is desirable to add aromatic or flavoring seasoning, and when this is done, the seasoning is added after the blending of the saccharine substance, and while the cereal is still in the agitator. The product may then be cooled and placed in containers ready for use. It may be eaten without any additional cooking and without the use of cream, milk or sugar.

The same steps may be taken with respect to barley, wheat or rye. A variety may be given to the product to suit the varied tastes of the consumers, by blending two or more of these cereals. For example, I may combine oats and barley, or oats and rye, or barley and rye, or barley and wheat, or make other combinations of cereals. In combining two or more cereals, the cereals are separately treated according to the process hereinabove described down to and including the roasting process. The roasted scales of the two or more cereals to be blended are then placed together in the agitator device and thoroughly mixed. The saccharine substance and seasoning will thereafter be added in the manner above stated.

It is found that cereals treated according to this process are free from rancidity, emitting a sweet, pleasant odor, and are palatable and nutritious after being kept in their containers for long periods of time.

The product is characterized by the fact that in the treatment of the cereal, the several grains are not ground into small particles, or steamed or boiled, or made into a pasty mass and later treated to assume its commercial form, but on the other hand, each individual kernel of the cereal receives individual treatment and appears as the individual scale in the finished product.

I claim as my invention:

1. The process of treating cereal grains to produce a ready-to-eat food which consists in tempering the hulled kernels, forming the same into substantially unbroken scales, and roasting the scales to crisp dryness while being agitated to preserve the individuality of the grains.

2. The process of treating cereal grains to produce a ready-to-eat food which consists in tempering the hulled grains, rolling the same into scales or disks of substantially unbroken surface, and roasting to crisp dryness and to effect a protective surfacing of the individual grains.

3. The process of treating cereal grains to produce a ready-to-eat food which consists in tempering the hulled grains, forming the same into substantially unbroken scales, roasting to dryness, and blending the crisp grains with a saccharine substance at a heat and under agitation to produce a coating on the individual grains.

4. A ready-to-eat food comprising hulled grains in the form of unbroken scales or disks, roasted to a crisp dryness, each grain having a protective surfacing effective to maintain its condition of crispness.

In testimony, that I claim the foregoing as my invention I affix my signature, in the presence of two witnesses, this 30th day of July, 1920.

SIGMUND LUFT.

Witnesses:
B. L. MacGregor,
L. A. Perlow.